2,907,629

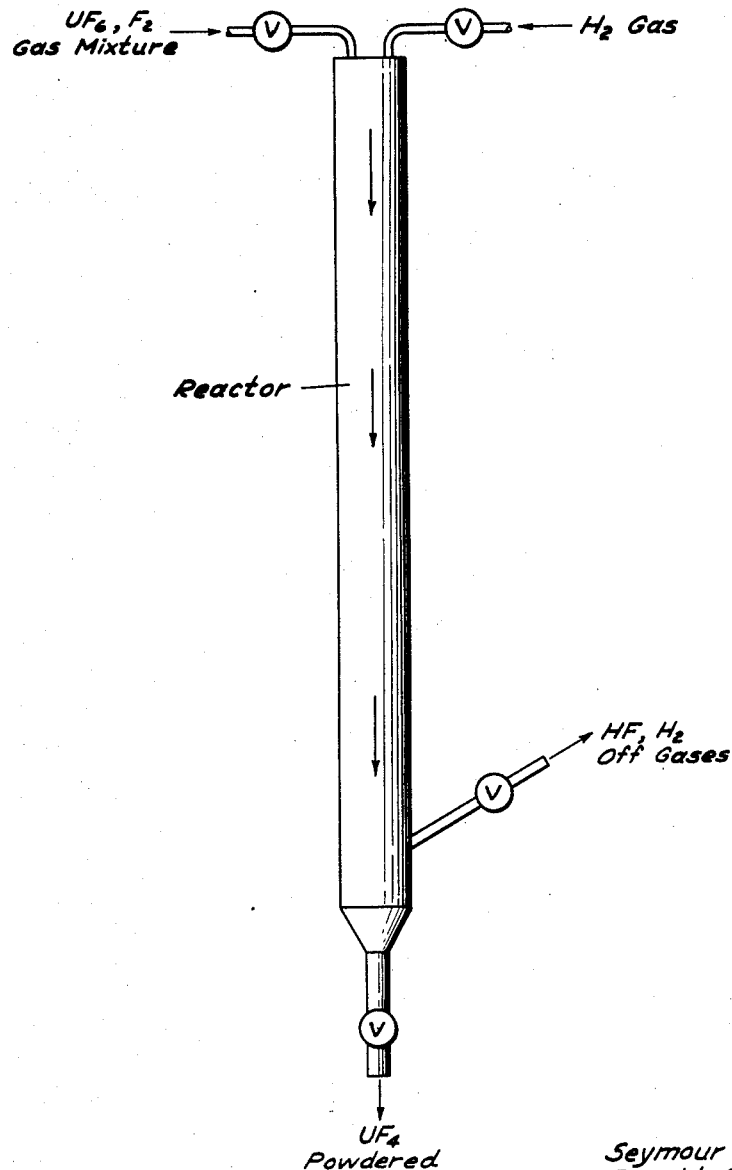

CONTINUOUS PROCESS FOR THE CONVERSION OF $UF_6$ TO $UF_4$

Seymour H. Smiley, Donald C. Brater, and Robert H. Nimmo, Oak Ridge, Tenn., assignors to the United States of America as represented by the United States Atomic Energy Commission Application May 7, 1953, Serial No. 353,663

5 Claims. (Cl. 23—14.5)

Our invention relates to an improved, continuous process for the conversion of $UF_6$ to $UF_4$.

In the production of metallic uranium from uranium hexafluoride it is desirable to produce uranium tetrafluoride as an intermediate product, rather than to attempt reduction of the hexafluoride to metal. For this purpose uranium tetrafluoride of high bulk density is particularly desirable. Uranium tetrafluoride is also a valuable intermediate in the production of uranium tetrachloride and various other compounds from uranium hexafluoride.

A method for converting $UF_6$ to $UF_4$ is taught in co-pending application S.N. 353,673, filed May 7, 1953, in the names of Seymour H. Smiley, Donald C. Brater and John W. Pike, now abandoned, wherein gaseous $UF_6$ is quantitatively reduced to $UF_4$ with hydrogen. In the operation of this process, however, difficulty has been experienced in the reduction of $UF_6$ without incurring the deposition of reaction products in the reactor. Such deposition was primarily due to reaction products adhering to the heated walls of the reactor and fusing thereto, and as a result, withdrawal of the product from the reactor was difficult. Furthermore, it was necessary to heat the reactor to relatively high temperatures in order to supply sufficient heat to the reaction zone to initiate the reaction between $UF_6$ and hydrogen, since lower reactor temperatures resulted in incomplete reduction. It was also found that lower reactor temperatures could not satisfactorily be employed by preheating the hydrogen and $UF_6$ to higher temperatures, for $UF_6$ becomes thermally unstable above approximately 800° F. Furthermore, while the bulk density of the $UF_4$ was related to the amount of excess hydrogen employed, it could not be regulated with a great deal of precision under these conditions. The completeness of a bomb reduction of $UF_4$ to uranium metal is directly related to the bulk density, and with a greater $UF_4$ bulk density, a better reduction is generally obtained. As used herein, "bulk density" refers to the maximum settled density of the $UF_4$ powder obtainable by vibration means.

With a knowledge of these problems, an object of our invention is to provide an improved process for the quantiative reduction of $UF_6$ to substantially pure $UF_4$ with hydrogen.

Another object of our invention is to provide an improved, continuous process for the quantitative conversion of $UF_6$ to $UF_4$ with hydrogen which does not foul process apparatus.

Still another object of our invention is to provide a process for converting $UF_6$ to $UF_4$ which employs relatively low temperatures.

Another object of our invention is to provide an improved continuous process for the conversion of $UF_6$ to $UF_4$ of high bulk density.

Other objects and advantages of our invention will become apparent from the following detailed description.

In accordance with our invention, we have provided an improved process for quantitatively converting $UF_6$ to substantially pure $UF_4$ which comprises continuously introducing gaseous $UF_6$, hydrogen, and fluorine into a reaction zone, collecting the resulting $UF_4$ powder and continuously withdrawing the resulting gases from said reaction zone.

Employing our invention, a quantitative conversion of $UF_6$ to $UF_4$ may be achieved without the fouling of process apparatus or the formation of any undesirable by-products. In addition, an appreciably more sensitive control over the bulk density of the $UF_4$ product may be exercised than is possible by prior art methods. We achieve these unexpectedly improved results without having to utilize relatively high gas preheat temperatures and without having to supply external heat to the reaction zone as is required in the process of the co-pending application referred to above.

We attribute the greatly improved results we have obtained to the fluorine which provides the heat of activation for the reaction, presumably by one or more side reactions.

While all the heat necessary to initiate the reaction may be supplied by the fluorine reactions, we nevertheless find it advantageous to preheat the gases moderately. Although the gases may be supplied to the reaction zone at widely varying temperatures, we find that temperatures considerably lower than those utilized in the prior art may be employed herein, thereby avoiding the deposition of reaction products in the reactor. Thus, we find that particularly satisfactory results may be obtained if each gas is preheated to a temperature of only approximately 175° to approximately 450° F., while we prefer to preheat each gas to a temperature of approximately 200° F. to approximately 300° F.

Table I, below, illustrates the control over the bulk density of the $UF_4$ which is obtainable by varying the ratio of fluorine to $UF_6$. This degree of control is highly desirable since it permits the use of only the minimum amount of relatively expensive fluorine required to give $UF_4$ of a desired bulk density.

TABLE I

*Bulk density as a function of fluorine concentration*

| | | | | |
|---|---|---|---|---|
| Ratio of fluorine to $UF_6$, by weight | 1/25 | 1/20 | 1/13 | 1/10 |
| Bulk density $UF_4$—grams/cc | 2.6 | 3.0 | 3.2 | 3.8 |

If the ratio of fluorine to $UF_6$, by weight, increases above about 1/10 or below about 1/25, the product may contain undesirable by-products, or the reduction may be inhibited.

Varying the amounts of hydrogen in the presence of fluorine in our process seemingly has less effect on the density of the $UF_4$ than it did in prior art methods. However, we find the reduction proceeds more satisfactorily with approximately a 100% to approximately 400% stoichiometric excess of hydrogen, while approximately a 300% stoichiometric excess is preferred.

Our invention may be practiced employing widely varying flow rates of $UF_6$, fluorine and hydrogen. Suitable $UF_6$ flow rates are from approximately 1.0 to approximately 1.9 lbs./hr./in.² reactor cross section while a flow rate of approximately 1.6 lbs./hr./in.² reactor cross section is preferred. Suitable hydrogen flow rates are from approximately 0.025 to approximately 0.05 lb./hr./in.² reactor cross section, while a flow rate of approximately 0.035 lb./hr./in.² reactor cross section is preferred. Suitable fluorine flow rates are from approximately 0.05 to approximately 0.1 lb./hr./in.² reactor cross section, while a flow rate of approximately 0.08 lb./hr./in.² reactor cross section is preferred.

In a preferred form of our invention, a mixture of $UF_6$ and fluorine, preheated to a temperature of approximately 200° F., is continuously introduced into a reaction zone at rates of approximately 1.6 lbs. of $UF_6$/hr./in.² reactor cross section and approximately .080 lb. of fluorine/hr./in.² reactor cross section, while hydrogen, preheated to a temperature of approximately 200° F., is concurrently continuously introduced into the reaction zone at a rate of approximately .035 lb./hr./in.² reactor cross section. The resulting $UF_4$ powder is collected and the resulting gaseous HF and unreacted hydrogen continuously withdrawn from the reaction zone.

A general understanding of our process may be had by reference to the attached drawing.

The following is a specific example of our invention.

EXAMPLE I

The process was conducted in a down-flow monel reactor of eleven foot height and four inch internal diameter.

A mixture of gaseous $UF_6$ and fluorine, preheated to 200° F., was continuously introduced at the top of the reactor at rates of 15.6 lbs. of $UF_6$/hr. and 1.0 lb. of fluorine/hr., while hydrogen preheated to 200° F. was simultaneously continuously introduced at the top of the reactor at a rate of 0.4 lb./hr. Unreacted hydrogen and the resulting gaseous HF were displaced downward from the reaction zone and withdrawn while the resulting $UF_4$ powder was collected from the bottom of the reactor. $UF_4$ was produced at a rate of 13.8 lbs./hr. which represented substantially complete reduction of the $UF_6$ and had a bulk density of 3.8 grams/cc.

A spectrochemical analysis of the $UF_4$ revealed that the total metallic contamination of the product was only about 5 parts per million which may have been due to contact with the reactor wall. The exhaust gas stream, consisting of HF and unreacted hydrogen, contained almost no traces of $UF_6$ as spectroscopically determined, thus further confirming the completeness of the reduction of $UF_6$.

In general, it may be said that the above example is merely illustrative and should not be construed as limiting the scope of our invention which should be understood to be limited only as indicated by the appended claims.

Having thus described our invention, we claim:

1. An improved continuous process for the quantitative conversion of $UF_6$ to $UF_4$, which comprises introducing gaseous $UF_6$, fluorine and hydrogen into a reaction zone, collecting the resulting $UF_4$ powder and continuously withdrawing the resulting gases from said reaction zone.

2. The process of claim 1 wherein the $UF_6$, fluorine and hydrogen are each preheated to a temperature of approximately 175° F. to approximately 450° F.

3. An improved continuous process for the conversion of $UF_6$ to $UF_4$, which comprises continuously introducing gaseous $UF_6$, fluorine and excess hydrogen into a reaction zone at rates of approximately 1.0 to approximately 1.9 lbs. of $UF_6$/hr./in.² reactor cross section, approximately 0.05 to approximately 0.1 lb. of fluorine/hr./in.² reactor cross section and approximately 0.025 to approximately 0.05 lb. of hydrogen/hr./in.² reactor cross section, collecting the resulting $UF_4$ powder and continuously withdrawing the resulting gaseous HF and unreacted hydrogen from said reaction zone.

4. The process of claim 5 wherein the $UF_6$, fluorine and hydrogen are each preheated to a temperature of approximately 175° F. to approximately 450° F.

5. An improved continuous process for the quantitative conversion of $UF_6$ to $UF_4$ which comprises continuously introducing $UF_6$, fluorine and excess hydrogen, each preheated to approximately 200° F., into a reaction zone at rates of approximately 1.5 lbs. of $UF_6$/hr./in.² reactor cross section, approximately 0.08 lb. of fluorine/hr./in.² reactor cross section, and approximately 0.035 lb. of hydrogen square/hr./in.² reactor cross section, collecting the resulting $UF_4$ powder and continuously withdrawing the resulting gaseous HF and unreacted hydrogen from said reaction zone.

References Cited in the file of this patent
UNITED STATES PATENTS 2,638,406    Tevelbaugh _____ May 12, 1953